(12) United States Patent
Bencherif et al.

(10) Patent No.: US 7,785,724 B2
(45) Date of Patent: Aug. 31, 2010

(54) SYSTEM AND METHOD FOR THERMAL CONTROL OF A FUEL CELL SYSTEM MOUNTED ON A MOTOR VEHICLE

(75) Inventors: Karim Bencherif, Puteaux (FR); Vincent Le Lay, Magny les Hameaux (FR)

(73) Assignee: Renault S.A.S., Boulogne Billancourt (FR)

( * ) Notice: Subject to any disclaimer, the term of this patent is extended or adjusted under 35 U.S.C. 154(b) by 264 days.

(21) Appl. No.: 11/577,274

(22) PCT Filed: Oct. 13, 2005

(86) PCT No.: PCT/FR2005/050847

§ 371 (c)(1),
(2), (4) Date: Apr. 13, 2007

(87) PCT Pub. No.: WO2006/040502

PCT Pub. Date: Apr. 20, 2006

(65) Prior Publication Data

US 2008/0038606 A1  Feb. 14, 2008

(30) Foreign Application Priority Data

Oct. 14, 2004 (FR) .................................. 04 10869

(51) Int. Cl.
*H01M 8/04* (2006.01)
*H01M 8/12* (2006.01)
*H01M 8/18* (2006.01)

(52) U.S. Cl. ............................. 429/24; 429/13; 429/17; 429/40

(58) Field of Classification Search .................. None
See application file for complete search history.

(56) References Cited

U.S. PATENT DOCUMENTS

2002/0025465 A1  2/2002  Christen et al.
2002/0164510 A1  11/2002  Brueck et al.

FOREIGN PATENT DOCUMENTS

JP          1052386         2/1989

*Primary Examiner*—Melvin C Mayes
*Assistant Examiner*—Sarah Van Oudenaren
(74) *Attorney, Agent, or Firm*—Oblon, Spivak, McClelland, Maier & Neustadt, L.L.P.

(57) ABSTRACT

(EN) The inventive system for thermal control of a fuel cell system mounted on a motor vehicle comprises a fluid heat carrier flow loop (BC) for thermally controlling a fuel cell (PAC), means for supplying said fuel cell (PAC) with oxygen (GCA) and hydrogen (R) and an electronic control unit (UCE) which is provided with an estimator (EST) for the temperature (Ts) of the fuel cell solid elements.

15 Claims, 3 Drawing Sheets

SYSTEM AND METHOD FOR THERMAL CONTROL OF A FUEL CELL SYSTEM MOUNTED ON A MOTOR VEHICLE

BACKGROUND OF THE INVENTION

I. Field of the Invention

The present invention relates to a system and to a method for controlling the temperature of a fuel cell system mounted on board a motor vehicle.

II. Description of Related Art

Controlling the temperature of the fuel cell is important to prevent the cell from overheating as this could lead to damage to the cell.

Standard fuel cells of the PEM (Proton Exchange Membrane) type comprise elemental individual cells which are made up in particular of a bipolar plate and of a Membrane Electrodes Assembly, or MEA for short. These are the solid elements of the fuel cell.

A fuel cell also comprises fluid elements including the products obtained by the electrochemical reactions that take place within the fuel cell in order to supply the electrical energy. Such a cell is supplied with hydrogen at the anode, for example by a reformer, and with oxygen at the cathode, generally by an air compressor unit.

Systems for controlling the temperature of a fuel cell do exist.

Documents U.S. Pat. No. 4,640,873, FR 2 809 535 and JP 9 213357 relate to systems for the temperature control of a fuel cell in which systems the temperature of the cell is assimilated to the temperature of the fluid elements.

However, there is a discrepancy between the temperature of the solid elements of the cell and of the fluid elements of the cell, and this leads to temperature control of limited effectiveness because it is based on the temperature of the fluid elements rather than on the temperature of the solid elements.

BRIEF SUMMARY OF THE INVENTION

The invention allows an estimation of the temperature of the solid elements of the cell with greater precision than assimilating the temperature of the solid elements of the cell to the temperature of the fluid elements of the cell.

One aspect of the invention proposes a system for the temperature control of a fuel cell system mounted on board a motor vehicle comprising a flow loop for circulating a heat-transfer fluid for temperature control of the fuel cell, oxygen supply means and hydrogen supply means for supplying the fuel cell, and an electronic control unit. The electronic control unit comprises an estimator for estimating the temperature of the solid elements of the fuel cell.

The temperature of the cell is therefore more precise because the temperature of the solid elements is not assimilated to the temperature of the fluid elements.

In a preferred embodiment, the electronic control unit further comprises a control module for controlling the operation of the flow loop.

For example, the estimator comprises input parameters including the temperature of the heat-transfer fluid upstream of the cell and the temperature of the heat-transfer fluid downstream of the fuel cell.

For example the estimator comprises input parameters including the temperature of the fluids leaving the cathode of the fuel cell.

For example, the estimator comprises input parameters including the temperature of the fluids leaving the anode of the fuel cell.

In one advantageous embodiment, the system comprises a comparator designed to compare the temperature of said solid elements as estimated by the estimator with a desired temperature of said solid elements as stored in memory by the electronic control unit and to transmit said comparison to said control module that controls the operation of the flow loop.

The invention also proposes a method for the temperature control of a fuel cell system mounted on board a motor vehicle. The method uses the circulation of a heat-transfer fluid. The temperature of the solid elements of the fuel cell is estimated and the temperature of the cell is controlled on the strength of said estimate.

In one advantageous embodiment the circulation of the heat-transfer fluid is altered on the strength of the estimated temperature of the solid elements of the fuel cell and of a desired temperature of the solid elements of the fuel cell.

In one advantageous embodiment, said estimate is performed using parameters including the temperature of the heat-transfer fluid upstream of the cell and the temperature of the heat-transfer fluid downstream of the fuel cell, or using parameters including the temperature of the fluids leaving the cathode of the fuel cell or using parameters including the temperature of the fluids leaving the anode of the fuel cell.

BRIEF DESCRIPTION OF THE DRAWINGS

The invention will be better understood from studying the following detailed description of a number of embodiments taken by way of nonlimiting examples and illustrated by the attached drawings in which.

DETAILED DESCRIPTION OF THE INVENTION

Figure 1:
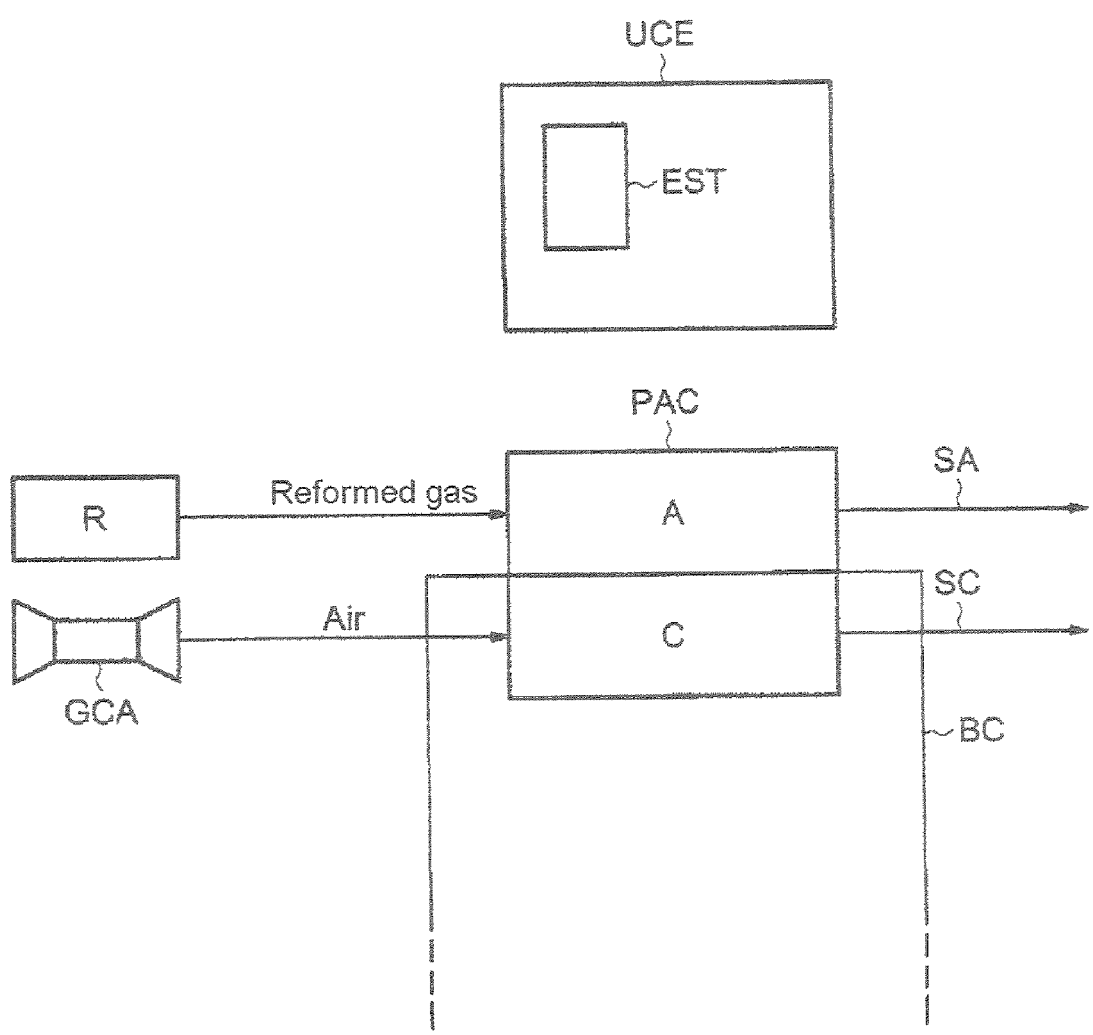
FIG. 1 is a block diagram of a fuel cell device according to the invention.

FIG. 1 depicts a fuel cell temperature control system according to the invention. The system comprises a fuel cell PAC comprising an anode part A and a cathode part C. The anode A is supplied with dihydrogen-rich reformed gas by a reformer X, and the cathode C is supplied with air, and therefore with oxygen, by an air compressor unit GCA. The fluids leaving the anode A pass through an outlet pipe SA and the fluids leaving the cathode C pass through an outlet pipe SC.

The system also comprises a flow loop BC for circulating a heat-transfer fluid for controlling the temperature of the fuel cell PAC. A portion of this flow loop BC passing through the fuel cell PAC is depicted in FIG. 1. This flow loop BC also comprises, in the conventional way, heat exchangers and condensers. The heat-transfer fluid passing through the cell can be used to cool the cell when its temperature becomes too high, and there is a fear of damage, or to heat the cell during a start-up phase.

The temperature control system also comprises an electronic control unit UCE which comprises an estimator EST capable of precisely estimating the temperature of the solid elements of the cell PAC.

Figure 2:
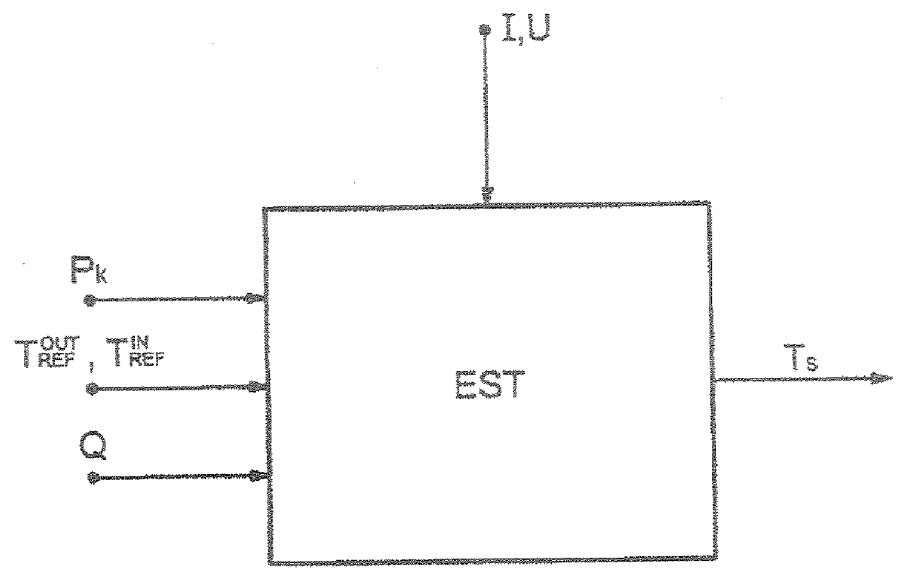
FIG. 2 is a block diagram illustrating a first embodiment of an estimator according to the invention.

FIG. 2 depicts a first embodiment of an estimator EST. The estimator EST receives at input the pressure $P_k$, with k=A in the case of anode pressure or k=C in the case of cathode pressure, the current I and the voltage U delivered by the cell, the flow rate Q of the heat-transfer fluid, and the temperatures of the heat-transfer fluid in the flow loop BC upstream $T_{REF}^{IN}$ and downstream $T_{REF}^{OUT}$ of the cell PAC.

In this embodiment, the estimator EST uses the following relationships regarding the temperature of the solid elements of the cell PAC:

$$\begin{cases} \dfrac{dT_s}{dt} = \dfrac{W_{therm}(I,U) - h_A \cdot S_A(T_S - T_A^{OUT}) - h_C \cdot S_C(T_S - T_C^{OUT}) - h_{ref} \cdot S_{ref}(T_S - T_{ref}^{OUT})}{M_{PAC} \cdot C_p} \\ \dfrac{dT_{ref}^{OUT}}{dt} = -V_{ref} \cdot \dfrac{T_{ref}^{OUT} - T_{ref}^{IN}}{L_{ref}} + \dfrac{h_{ref} \cdot S_{ref}}{r_{ref} \cdot C_{p,ref} \cdot Vol_{ref}} \cdot (T_S - T_{ref}^{OUT}) \end{cases}$$

in which:

$T_{REF}^{IN}$, $T_{REF}^{OUT}$ are the temperatures of the heat-transfer fluid upstream and downstream of the cell, respectively, in K;

$T_S$ is the mean temperature of the solid elements of the fuel cell, in K;

$L_{ref}$ is the length of the flow loop BC or cooling circuit, in m;

$\rho_{ref}$ is the density of the heat-transfer fluid, in kg/m³;

$C_{p,ref}$ is the specific heat capacity of the heat-transfer fluid, in J/kg/K;

$h_{ref}$ is the coefficient of convection of the flow loop BC, in W·m⁻²·K⁻¹;

$S_{ref}$ is the surface area for exchange of heat between the flow loop and the cell, in m²;

$V_{ref}$ is the volume of heat-transfer fluid from the flow loop in the cell, in m³;

$W_{therm}(I,U)$ is the thermal power dissipated by the cell, in W;

$h_A$ is the convection coefficient at the inlet side of the anode circuit, in W·m⁻²K⁻¹;

$S_A$ is the surface area for exchange of heat between the anode circuit and the cell, in m²;

$h_C$ is the convection coefficient at the inlet side of the cathode circuit, in W·m⁻²K⁻¹;

$S_C$ is the surface area for exchange of heat between the cathode circuit and the cell, in m²;

$T_A^{OUT}$ is the temperature of the fluid elements or gases on the outlet side of the anode, in K;

$T_C^{OUT}$ is the temperature of the fluid elements or gases on the outlet side of the cathode, in K;

$M_{PAC}$ is the mass of the cell, in kg;

$C_p$ is the specific heat capacity of the fuel cell in J·kg⁻¹·K⁻¹;

Using the perfect gas law $$\rho_k = \frac{P_k}{r \cdot T_k^{OUT}}$$

in which k denotes A or C;

$\rho_k$ is the density of the anode gas if k=A or of the cathode gas if k=C;

$P_k$ is the anode pressure if k=A or cathode pressure if k=C;

R is the perfect gas constant; and $T_k^{OUT}$ is $T_A^{OUT}$ if k=A, $T_C^{OUT}$ if k=C and the relationships are simplified by setting the following:

$$\begin{cases} \alpha_k = \dfrac{1}{h_k \cdot S_k \cdot L} \\ \beta_k(P_k, V_k) = \dfrac{P_k \cdot C_{p,k} \cdot V_k(t)}{r} \cdot \alpha_k \\ \alpha_{ref} = \dfrac{C_p}{h_{ref} \cdot S_{ref}} \end{cases}$$

where:

$C_{p,k}$ denotes the specific heat capacity of the anode if k=A or of the cathode if k=C, in J·kg⁻¹·K⁻¹;

$V_k$ represents the velocity of the anode gases if k=A or cathode gases if k=C, in m/s; and L denotes the length of the pipe work, in m.

This then yields the following equations:

$$\hat{T}_s = T_k^{OUT} + \beta_k(P_k, V_k) \cdot \left(1 - \frac{T_k^{IN}}{T_k^{OUT}}\right) - \alpha_k \cdot L_v(T_k^{OUT}) \cdot N_{k,H_2O(l)}^{OUT}$$

in which:

$T_k^{OUT}$ is the anode outlet temperature if k=A or cathode outlet temperature if k=C, in K;

$T_k^{IN}$ is the anode inlet temperature if k=A or cathode inlet temperature if k=C, in K;

$L_v$ is the latent heat of fusion of waters in J/mol; and $N_{k,H_2O(l)}^{OUT}$ is the flow rate of liquid water leaving the anode if k=A or leaving the cathode if k=C, in mol/s;

and $\hat{T}_s = \alpha_{ref} \cdot Q(T_{ref}^{OUT} - T_{ref}^{IN}) + T_{ref}^{OUT}$ from the flow loop in which Q is the flow rate of heat-transfer fluid, in mol/s.

The estimator EST can also use linearization of the non-linear system about an operating point.

Figure 3:
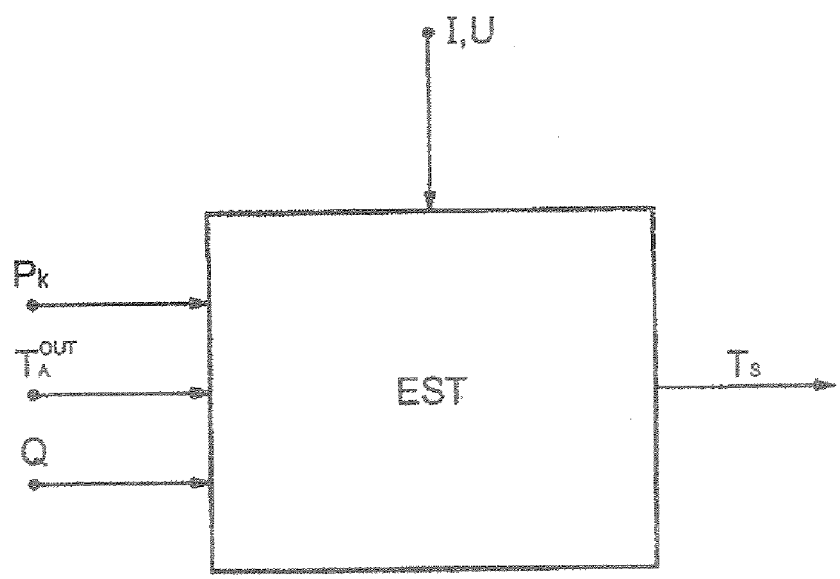
FIG. 3 is a block diagram illustrating a second embodiment of an estimator according to the invention.

FIG. 3 depicts a second embodiment of an estimator EST This embodiment uses the equation:

$$\hat{T}_s = T_k^{OUT} + \beta_k(P_k, V_k) \cdot \left(1 - \frac{T_k^{IN}}{T_k^{OUT}}\right) - \alpha_k \cdot L_v(T_k^{OUT}) \cdot N_{k,H_2O(l)}^{OUT}$$

The estimator EST receives at input the pressure $P_k$, with k=A in the case of anode pressure or k=C in the case of cathode pressure, used to reset the convection coefficients, the current I and the voltage U delivered by the cell, the flow rate Q of the heat-transfer fluid, and the temperature $T_A^{OUT}$ of the gases leaving the anode part A of the cell PAC. The temperature $T_A^{IN}$ at the inlet to the anode part A is deduced from these inputs.

The estimator EST can also use linearization of the non-linear system about an operating point.

Figure 4:
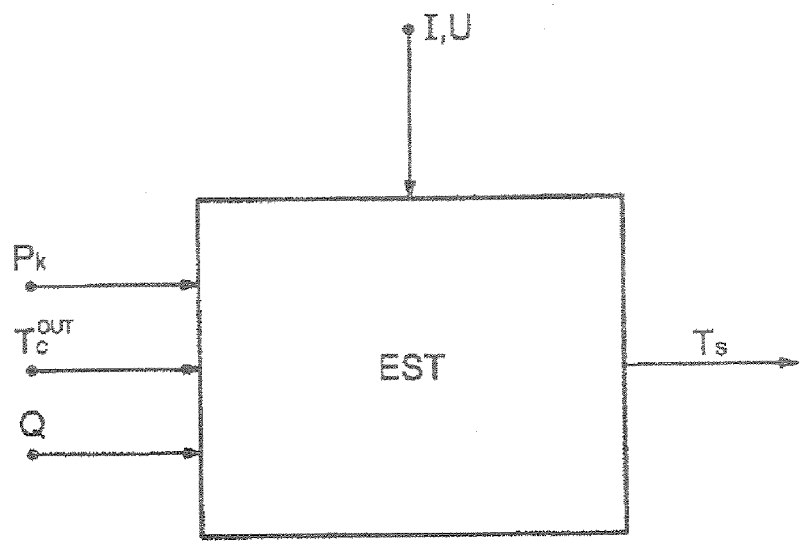
FIG. 4 is a block diagram illustrating a third embodiment of an estimator according to the invention.

FIG. 4 depicts a third embodiment of an estimator EST. This embodiment uses the equation:

$$\hat{T}_s = \alpha_{ref} \cdot Q(T_{ref}^{OUT} - T_{ref}^{IN}) + T_{ref}^{OUT}$$

The estimator EST receives at input the pressure $P_k$, with k=A in the case of anode pressure or k=C in the case of cathode pressure, used to reset the convection coefficients, the current I and the voltage U delivered by the cell, the flow rate Q of the heat-transfer fluid and the temperature $T_C^{OUT}$ of the gases leaving the cathode part C of the cell PAC. The temperature $T_C^{IN}$ of the gases entering the cathode part is deduced from these inputs.

The estimator EST can also use linearization of the non-linear system bout an operating point.

Figure 5:
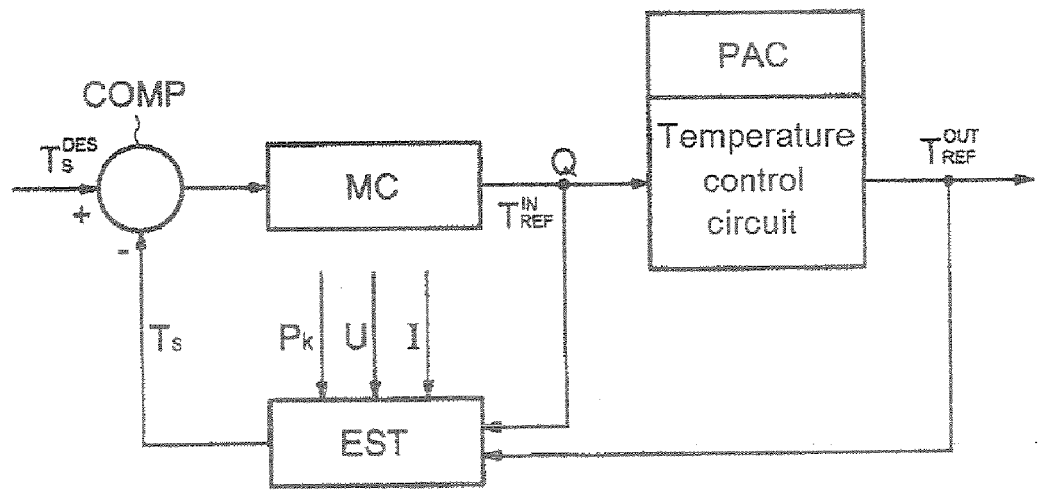
FIG. 5 is a temperature control system according to the invention.

FIG. 5 depicts one embodiment of a temperature control system according to the invention. The system comprises an estimator as already described, for example that of FIG. 2. The system comprises a comparator COMP which makes a comparison between the temperature $T_s$ of the solid elements of the fuel cell PAC as estimated by the estimator EST and a desired temperature $T_S^{DES}$ as stored in memory by the electronic control unit UCE. The comparison is transmitted to a control module MC capable of controlling the operation of the flow loop BC in which the heat-transfer fluid circulates and of its elements in order to influence the flow rate Q of heat-transfer fluid passing through the cell PAC and the inlet temperature $T_{REF}^{IN}$ of the heat-transfer fluid.

The invention allows better temperature control of a fuel cell by improving the precision with which the temperature of the solid elements of the fuel cell is estimated.

The invention claimed is:

1. A system for temperature control of a fuel cell system mounted on board a motor vehicle, comprising:
   a flow loop to circulate a heat-transfer fluid to control a temperature of the fuel cell;
   an oxygen supply unit and a hydrogen supply unit to supply oxygen and hydrogen to the fuel cell; and
   an electronic control unit including an estimator programmed to utilize input parameters, including a length of the flow loop, to estimate a temperature of solid elements of the fuel cell.

2. The system as claimed in claim 1, wherein the electronic control unit further comprises a control module to control operation of the flow loop.

3. The system as claimed in claim 1, wherein the input parameters include a temperature of the heat-transfer fluid upstream of the fuel cell and a temperature of the heat-transfer fluid downstream of the fuel cell.

4. The system as claimed in claim 1, wherein the input parameters include a temperature of fluids leaving a cathode of the fuel cell.

5. The system as claimed in claim 1, wherein the input parameters include a temperature of fluids leaving an anode of the fuel cell.

6. The system as claimed in claim 1, further comprising a comparator configured to compare the temperature of the solid elements as estimated by the estimator with a desired temperature of the solid elements as stored in a memory by the electronic control unit, and to transmit the comparison to the control module that controls operation of the flow loop.

7. The system as claimed in claim 1, wherein the input parameters include a surface area for exchange of heat between the flow loop and the fuel cell.

8. The system as claimed in claim 1, wherein the input parameters include a mass of the fuel cell.

9. The system as claimed in claim 1, wherein the input parameters include a specific heat capacity of the fuel cell.

10. A method for temperature control of a fuel cell system mounted on board a motor vehicle using circulation of a heat-transfer fluid, comprising:
    estimating a temperature of solid elements of the fuel cell utilizing input parameters including a length of a flow loop through which the heat-transfer fluid is circulated; and
    controlling a temperature of the fuel cell based on the estimated temperature.

11. The method as claimed in claim 10, wherein the controlling the temperature of the fuel cell includes altering the circulation of the heat-transfer fluid based on the estimated temperature of the solid elements of the fuel cell and a desired temperature of the solid elements of the fuel cell.

12. The method as claimed in claim 10, wherein the estimating is performed using the input parameters including a temperature of the heat-transfer fluid upstream of the cell and a temperature of the heat-transfer fluid downstream of the fuel cell, or using the input parameters including a temperature of fluids leaving a cathode of the fuel cell, or using the input parameters including a temperature of fluids leaving an anode of the fuel cell.

13. The method as claimed in claim 10, wherein the input parameters include a surface area for exchange of heat between the flow loop and the fuel cell.

14. The method as claimed in claim 10, wherein the input parameters include a mass of the fuel cell.

15. The method as claimed in claim 10, wherein the input parameters include a specific heat capacity of the fuel cell.

* * * * *